United States Patent [19]

Rachocki

[11] 3,905,386
[45] Sept. 16, 1975

[54] VALVE
[75] Inventor: Eugene Rachocki, Erie, Pa.
[73] Assignee: Zurn Industries, Inc., Erie, Pa.
[22] Filed: Apr. 22, 1974
[21] Appl. No.: 462,652

[52] U.S. Cl............................ 137/215; 137/516.17
[51] Int. Cl.² ......................................... F16K 24/00
[58] Field of Search .......... 137/111, 112, 113, 215,
137/525, 516.17, 516.19, 516.21, 516.23

[56] References Cited
UNITED STATES PATENTS
1,636,888  7/1927  Wishart................ 137/516.21
2,804,086  8/1957  Johnston............ 137/516.23 X 3,092,130  6/1963  Hewitt ..................... 137/112
3,228,418  1/1966  Rosback et al. ......... 137/525 X
3,661,174  5/1972  Cripe ................... 137/519.5 X Primary Examiner—Henry T. Klinksiek

[57] ABSTRACT

A valve for automatically disconnecting a water supply from an outlet when water from another source is connected to the valve. The valve has two inlets: one connected to the city water supply and the other connected to the tank water supply. The check valve closes off the tank water supply automatically when water under pressure is connected to the city water supply. Thus, the water from the city water is prevented from entering the supply tank.

5 Claims, 3 Drawing Figures

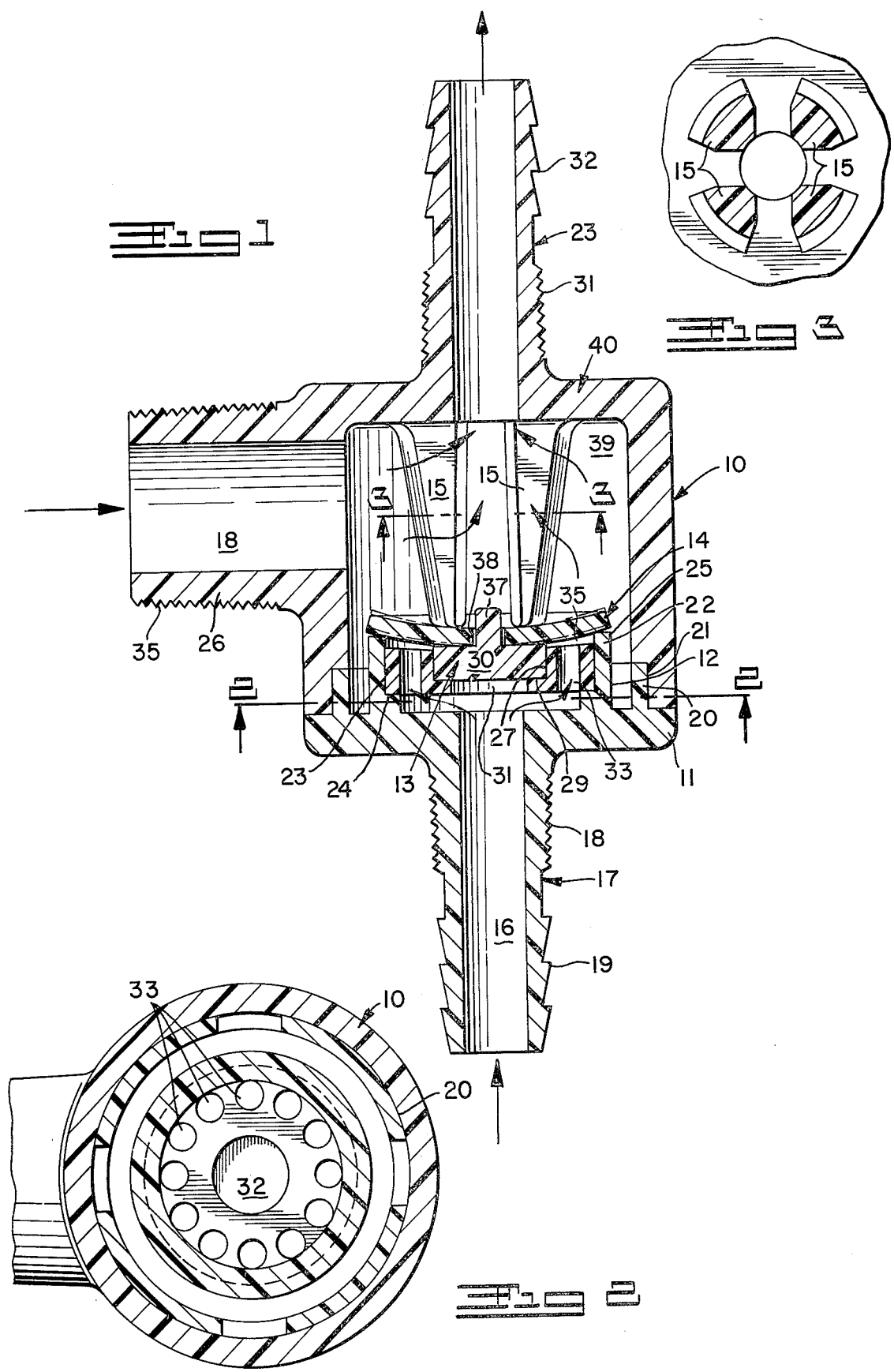

VALVE

GENERAL STATEMENT OF INVENTION

It is desirable for the fresh water supply tank of a recreational vehicle to be turned off while the water system is connected to a source of city water to prevent city water from entering the supply tank. The many reasons for this are well known to those skilled in the art.

OBJECTS OF THE INVENTION

It is an object of the invention to provide an improved valve.

Another object of the invention is to provide an improved valve that is simple in construction, economical to manufacture, and simple and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

GENERAL DESCRIPTION OF THE DRAWINGS

FIG. 1 is a longitudinal cross sectional view of the valve according to the invention.

FIG. 2 is a cross sectional view taken on line 2—2 of FIG. 1.

FIG. 3 is a partial cross sectional view taken on line 3—3 of FIG. 1.

DETAILED DESCRIPTION OF THE DRAWINGS

Now with more particular reference to the drawings, the valve is made up generally of a housing 10 which is in the form of a hollow cylinder closed at one end by an integral end member 40 and closed at the other end by the end cap 11. The end cap 11 has the tube 17 fixed to its center. The tube 17 has a flow passage 16 therethrough that communicates with the inside of the housing 10.

The tube 17 is threaded at 18 to receive a threaded pipe or hose fitting and it also has a serrated part 19 that may be secured to an unthreaded flexible pipe or hose. The end cap 11 has an axially extending outer flange 20 that is received in the counterbore 21 in the housing 10. An annular axially extending cylindrical flange 22 is integrally fixed to the end cap 11 and spaced inwardly from the flange 20. The flange 22 defines a counterbore 23' and provides a seat 24 on which the diaphragm plate 12 rests. The diaphragm plate 12 fits in the counterbore defined by flange 22 and is held in spaced relation from the end cap 11. The distal end 25 of flange 22 provides a continuous annular seat on which the outer periphery of the diaphragm rests and which forms a seal with the diaphragm 14.

Diaphragm plate 12 is a flat circular disk with a counterbore 27 providing a hollow cylindrical space and a shoulder 29 on which the cylindrical post 13 rests. The diaphragm plate 12 also has a central opening 31 which communicates with the flow passage 16 and the inlet opening in end cap 11. Diaphragm plate 12 also has spaced holes 33 which communicate between the space below the diaphragm plate and the space 35 above diaphragm plate 12.

The post 13 has a round disklike part 30 which snugly fits in the central bore 27 of the diaphragm plate. Pintel 37 is integrally fixed to the disk 30 and extends upwardly therefrom. Pintel 37 is received in central hole 38 in diaphragm 14.

Housing 10 has the hollow 39 in its cylindrical part and closed end member 40. Outlet tube 23 is integrally attached to the end 40 and has threads 31 which are slightly larger in diameter than the serrations 32. Thus, either an unthreaded hose can be clamped to the serrations 43 or an internally threaded pipe coupling can be connected to the threaded ends 42.

Second inlet tube 26 is externally threaded at 35 and communicates with the inside of housing 10 through opening 18.

Spaced axially extending fingers 15 are integrally attached to the inside of end 40 of housing 10 around the opening. Fingers 15 are generally wedge shaped in cross section and taper toward the diaphragm 14 and the distal ends. Fingers 15 rest on diaphragm 14 outside of the pintel 37 and engage the outer periphery of the diaphragm and hold the diaphragm down in engagement with the upper surface of the disk 30.

To assemble a valve, with the housing 10 separated from the end cap 11, diaphragm plate 12 is inserted in the hollow cylindrical counterbore defined by flange 22 with pintel 37 extending through central hole 38 in the diaphragm 14. The end cap 11 with the diaphragm plate 12, central post and diaphragm assembled to it, can then be assembled to the housing 10 and fixed thereto by a suitable adhesive material. Fingers 15 will then engage the diaphragm around the central opening distorting the diaphragm center to the dished shape shown in FIG. 3.

In operation, when the inlet tube 26 is connected to a city water supply, the outer peripheral edge of the diaphragm 14 is forced down into engagement with the distal end 25 of the flange 22, thus shutting off the flow of water from the city water supply to the fresh water tank connected to inlet 17.

When the city water is disconnected from inlet 26, inlet 26 is closed and water from the fresh water tank of the vehicle exerts a pressure through inlet 17 through space 34 and through the holes 33 against the underside of the diaphragm 14. Thus, the diaphragm 14 will be deflected upwardly away from the end 25 allowing water to flow from the inlet 17 into housing 10 and out through outlet 23. The fingers 15 hold the central part of the diaphragm 14 against the disklike part 30 of the post 13. The central post 13 holds the diaphragm 14 against movement laterally.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A valve comprising a housing in the form of a hollow cylinder with an end cap fixed to said housing forming a closed hollow body, a first inlet opening and an outlet opening connected to said hollow body, a diaphragm plate, said end cap having a second inlet opening, means supporting a diaphragm over said second inlet opening, first support means preventing said diaphragm from moving toward said closed end, and second means supporting said diaphragm preventing said diaphragm from moving laterally, the outer periphery of said diaphragm being adapted to be deflected by the pressure of water from said first inlet forcing said diaphragm into engagement with said second diaphragm support means, said diaphragm being adapted to be deflected by water pressure from said second inlet whereby said diaphragm is deflected away from said second diaphragm support and water can flow from said second inlet to said outlet, said diaphragm plate comprising a flat circular disc having a counter bore providing a hollow space and a shoulder, said second means resting on said shoulder.

2. The valve recited in claim 1 wherein said means supporting said diaphragm against moving laterally comprises a center post supported on said closed end, said center post having a pintel thereon extending through a central opening in said diaphragm.

3. The valve recited in claim 2 wherein said diaphragm is in the form of a circular disk having said opening in the center thereof, said opening comprises a hole extending through said diaphragm.

4. The valve recited in claim 1 wherein said end cap has a cylindrical flange fixed to it, said flange extends toward said closed end and is disposed concentric to said inlet.

5. The valve recited in claim 4 wherein said diaphragm is generally in the form of a circular disk with a hole through its center, said first supporting means comprises spaced fingers attached to said closed end and extending toward said cap, the ends of said fingers engage said diaphragm at a position spaced outwardly from said central hole holding said diaphragm in a dished shape.

\* \* \* \* \*